(No Model.)
M. M. HAYDEN.
GALVANIC BATTERY.
No. 500,284. Patented June 27, 1893.
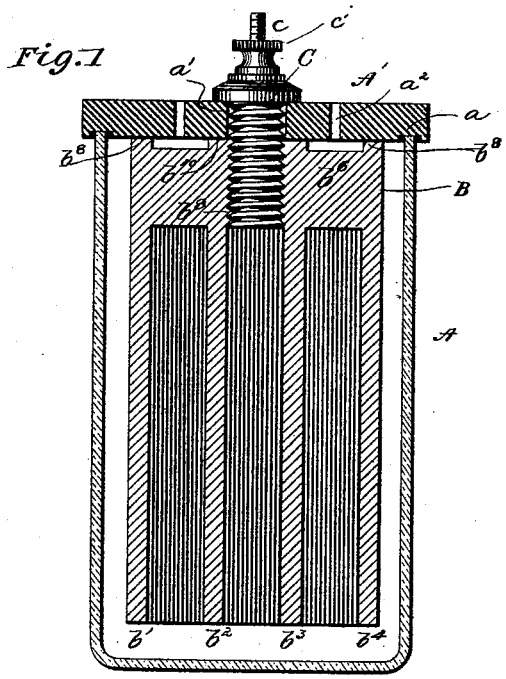
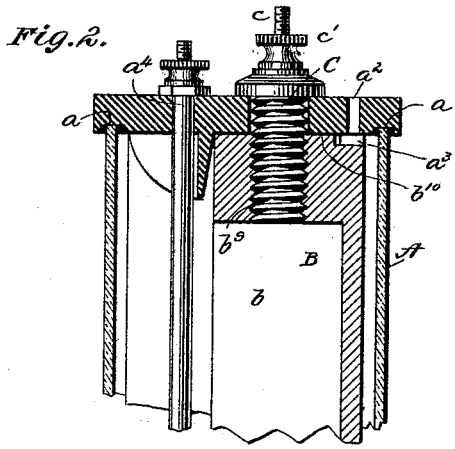
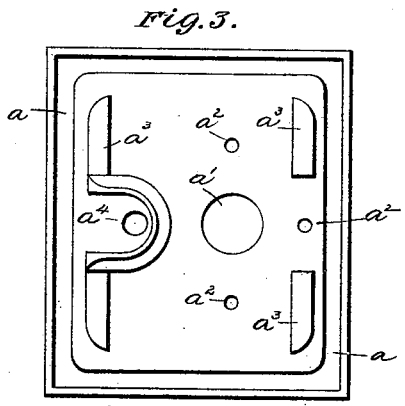
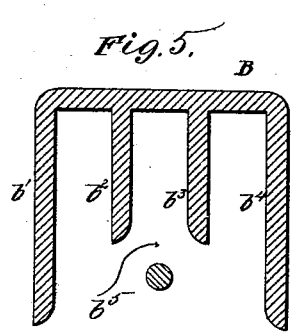
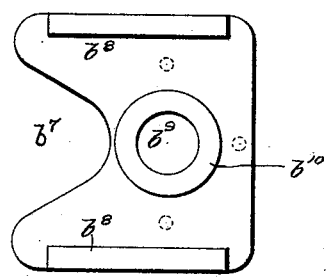
WITNESSES:
Frank S. Ober
Jos. J. Uhl
INVENTOR
Mortimer M. Hayden.
BY
Rosenbaum
ATTORNEY.

UNITED STATES PATENT OFFICE.

MORTIMER M. HAYDEN, OF NEW YORK, N. Y., ASSIGNOR TO THE LAW BATTERY COMPANY, OF NEW JERSEY.

GALVANIC BATTERY.

SPECIFICATION forming part of Letters Patent No. 500,284, dated June 27, 1893.

Application filed April 28, 1892. Serial No. 431,088. (No model.)

*To all whom it may concern:*

Be it known that I, MORTIMER M. HAYDEN, a citizen of the United States, residing in New York, in the county of New York and State of New York, have invented certain new and useful Improvements in Galvanic Batteries, of which the following is a specification.

This invention relates to galvanic batteries and has special reference to the open circuit type of battery.

The objects of the invention are to provide efficient and durable means for supporting and connecting up the carbon element of such batteries; to provide efficient means for sealing the jar or cell and to provide a form of carbon which will give large surface.

The invention consists of the details of construction hereinafter described and claimed.

In the accompanying drawings: Figure 1 represents a vertical central section of the entire cell; Fig. 2 a similar section but taken at right angles to Fig. 1; Fig. 3 a plan of the under side of the cover; Fig. 4 a plan of the carbon electrode; Fig. 5 a transverse section of the carbon electrode, and Fig. 6 is a view of the connecting and supporting plug.

Referring to the drawings by letter, A represents the outer or containing jar or vessel, and A' is its cover. The jar and cover are preferably made square or may be of any desired shape. The cover is of a composite material, of wood or any other insulating material and is provided on its under side with an annular groove $a$, into which the edge of the jar A projects when the cover is in place. This groove contains a paraffine or other kind of wax or cement, into which the jar embeds itself when in position and pressed down a little. This effectually prevents undue evaporation in the cell and also prevents the creeping of the salts beyond the edges of the jar. The cover is provided with a large central circular opening $a'$, for a purpose which will hereinafter appear, and with smaller openings $a^2$ through which gases formed in the cell may escape. The under side of the cover is also provided with three lugs $a^3$, &c., the object of which will appear hereinafter. There is also a semi-circular flange or half cylinder formed on the lower side of the cover near one edge and surrounding an opening $a^4$, through which the zinc or positive electrode projects. The carbon electrode is supported by a holder which passes through the central opening $a'$, and this flange is placed between the holes $a'$ and $a^4$ to prevent short-circuiting through dry salts or particles of dust or foreign matter which may collect on the under surface of the cover and thus bridge across from one electrode to the other.

B represents the carbon electrode. It is substantially rectangular in shape and consists of a back plate $b$ to one side of which are attached four parallel plates $b'$, $b^2$, $b^3$ and $b^4$. $b'$ and $b^4$ project from the edges of $b$ and are about the same size, but $b^2$ and $b^3$ are about half the width of $b'$ and $b^4$ so that a free space $b^5$ is left for the zinc pencil, which when located therein is almost surrounded by surfaces of carbon. All of the plates of carbon are connected together at the top by a horizontal thick plate $b^6$, which has a depression $b^7$ on one side directly over the space $b^5$. This top plate may be regarded as the head of the carbon. It is shown in plan in Fig. 4 and is provided with two long lugs $b^8$ which when the cover and carbon are properly adjusted with respect to each other, register with the lugs $a^3$ on the lower side of the cover and thus prevent displacement of the carbon. The head of the carbon in the center is provided with a vertical hole $b^9$ of comparatively large diameter and this is surrounded on the surface by a flange $b^{10}$ which rests against the lower side of the cover when the parts of the cell are assembled. This hole is provided with a coarse screw-thread.

The carbon is supported by a plug C shown in Fig. 6. This is made of extra hard carbon. It has a screw-threaded body which fits the hole $b^9$, and a head which when in place rests upon the upper surface of the cover. The plug is passed through the opening $a'$ in the cover and screwed into the hole $a^9$ in the carbon until the carbon is drawn up close against the under side of the cover and is brought into its proper position by the lugs $a^3$ and $b^8$. When the plug is screwed up tight, the carbon and cover are solidly connected. The positions of the holes $a^2$ in the cover are indicated by dotted lines in Fig. 4, and it will thus be seen that when the cover and carbon are together, there is an open space between the flange $b^{10}$ and lugs $b^8$ through which gases may pass from the solution to the vent-holes $a^2$. The head of the plug C is provided with a central bolt $c$ which is cast in when the plug is formed or attached to it in any other suitable way and upon which is screwed a thumb-nut $c'$ under which may be fastened a wire. It will be observed that this nut and bolt are nowhere exposed inside of the cell and therefore cannot be attacked by the gases or creeping salts.

Heretofore, the carbon electrode has sometimes been secured to the cover by a metal connection consisting of a bolt firmly secured on the head of the carbon element, projecting through an opening in the cover and fitted on the outside with washers and nuts. With all connections where metal is used a great deal of trouble is caused by reason of the gases and salts rising from the solution and getting in between the head of the carbon and the cover and attacking that portion of the bolt which is exposed in the hole in the cover or between the cover and head of the carbon. This causes corrosion and finally destruction of the metal connection, which in many instances means the loss of the entire carbon. It will be observed that in my construction the connection between the carbon and cover is of material which is not affected by the gases or salts and no deterioration of the kind mentioned can take place. At the same time I provide a serviceable metallic binding post for connecting on a circuit wire which is so located as not to be affected by the injurious gases or salts of the cell. An excellent contact between the binding post and carbon electrode is also acquired by reason of the large screw-threaded surface between the plug and carbon.

Although the invention has been described in connection with an open circuit battery, it is obvious that the plug connector may be used on a closed circuit cell where the carbon electrode is supported in a porous cup or by other means than the cover, in which case the function of the plug would be that of a connector simply and in that capacity would obviate the troublesome corrosion heretofore encountered with the metallic connection. It is known that the moisture which is absorbed by the carbon element, in making contact with the metallic connectors, causes a large amount of the corrosion; my improved carbon plug may be made sufficiently hard and nonporous by treatment as not to absorb moisture and will therefore prevent access of moisture to the binding post which it carries.

Having thus described my invention, I claim—

1. In a galvanic battery, the combination with an electrode, of a separable carbon plug, the electrode and the plug being formed with interlocking parts so that the plug will support the electrode substantially as described.

2. In a galvanic battery, the combination with a containing vessel and its cover, of a carbon electrode and a carbon plug connecting the electrode and cover together, the electrode and plug being formed with interlocking parts for the purpose set forth.

3. In a galvanic battery, the combination with a carbon electrode, of a carbon plug screw-threaded into the electrode and adapted as a support or connection for the same, as set forth.

4. In a galvanic battery the combination with a carbon electrode, of a carbon plug interlocking with said electrode, and a binding post carried by the plug.

5. In a galvanic battery, the combination with a containing vessel and its cover, of a carbon electrode, a carbon plug connecting the electrode with the cover and interlocking with the electrode and a binding post carried by the plug and located outside the containing vessel.

6. In a galvanic battery, the combination with a containing vessel and its cover, the latter provided with lugs or depressions on its under side, of a battery element provided with lugs or depressions registering with those on the cover and preventing displacement of the battery element and means for securing the cover and battery element together.

7. In a galvanic battery, a carbon electrode having four parallel plates connected together across one end by another plate and across the top by a horizontal plate, whereby large surface is obtained.

8. In a galvanic battery, a carbon electrode having four parallel plates connected together across one end by another plate and across the top by a horizontal plate, the two intermediate plates of the four being narrower than the two end plates, to provide a space for another element of the battery substantially as described.

In witness whereof I have hereunto signed my name in the presence of two subscribing witnesses.

MORTIMER M. HAYDEN.

Witnesses:
FRANK S. OBER,
JAMES F. KAVANAGH.